United States Patent
Fan

(10) Patent No.: US 11,325,036 B2
(45) Date of Patent: May 10, 2022

(54) INTERFACE DISPLAY METHOD AND APPARATUS, ELECTRONIC DEVICE, AND COMPUTER-READABLE STORAGE MEDIUM

(71) Applicant: Tencent Technology (Shenzhen) Company Limited, Shenzhen (CN)

(72) Inventor: Yourui Fan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 197 days.

(21) Appl. No.: 16/922,806

(22) Filed: Jul. 7, 2020

(65) Prior Publication Data

US 2020/0330868 A1  Oct. 22, 2020

Related U.S. Application Data

(63) Continuation of application No. PCT/CN2019/080971, filed on Apr. 2, 2019.

(30) Foreign Application Priority Data

May 18, 2018 (CN) .......................... 201810480564.8

(51) Int. Cl.
    *A63F 13/5255* (2014.01)
    *A63F 13/837* (2014.01)
    *A63F 13/65* (2014.01)

(52) U.S. Cl.
    CPC .......... *A63F 13/5255* (2014.09); *A63F 13/65* (2014.09); *A63F 13/837* (2014.09);
    (Continued)

(58) Field of Classification Search
    CPC ..... A63F 13/5255; A63F 13/837; A63F 13/65
    See application file for complete search history.

(56) References Cited

U.S. PATENT DOCUMENTS

2009/0181737 A1\* 7/2009 Argentar ............... A63F 13/837 463/2
2015/0080071 A1\* 3/2015 Eyal ..................... A63F 13/837 463/2

FOREIGN PATENT DOCUMENTS

| CN | 105597315 A | 5/2016 |
| CN | 105 824426 A | 8/2016 |

(Continued)

OTHER PUBLICATIONS

Master India, Youtube video: FPS1.10 Gun Aim Sensitivity. Unity3D FPS Game Design Tutorial, Published Nov. 21, 2011. Available online: https://www.youtube.com/watch?v=T8G3uXSAZ3g. (Year: 2011).\*
Game Development, What makes aiming in a console first person shooter feel good? published Aug. 12, 2011 (Available Online: https://gamedev.stackexchange.com/questions/1083/what-makes-aiming-in-a-console-first-person-shooter-feel-good) (Year: 2011).\*
Tencent Technology, ISR, PCT/CN2019/080971, dated Jul. 2, 2019, 3 pgs.

(Continued)

Primary Examiner — James S. McClellan
(74) Attorney, Agent, or Firm — Morgan, Lewis & Bockius LLP

(57) ABSTRACT

An interface display update method is performed by an electronic device, including: displaying a virtual item currently controlled by a virtual object in a virtual scene; detecting a perspective rotation operation associated with the virtual object; obtaining a target rotation angle, a first rotation speed of a perspective of the virtual object, and a second rotation speed of the virtual item according to the perspective rotation operation, the second rotation speed being less than the first rotation speed; and updating the virtual scene, based on the target rotation angle, the first rotation speed of the perspective of the virtual object, and the second rotation speed of the virtual item, using a target animation in which the virtual scene changes in accordance with the perspective rotation operation, the target animation visualizing an effect that rotation of the virtual item lags behind rotation of the perspective of the virtual object.

20 Claims, 9 Drawing Sheets

(52) U.S. Cl.
CPC ............... *A63F 2300/8076* (2013.01); *A63F 2300/8082* (2013.01)

(56) References Cited

FOREIGN PATENT DOCUMENTS

| | | |
|---|---|---|
| CN | 105912232 A | 8/2016 |
| CN | 106293070 A | 1/2017 |
| CN | 206103297 U | 4/2017 |
| CN | 106861186 A | 6/2017 |
| CN | 107305426 A | 10/2017 |
| CN | 107506122 A | 12/2017 |
| CN | 107519644 A | 12/2017 |
| CN | 107765986 A | 3/2018 |
| CN | 108635857 A | 10/2018 |
| JP | 2006018476 A | 1/2006 |
| JP | 2008250813 A | 10/2008 |
| JP | 2015223258 A | 12/2015 |

OTHER PUBLICATIONS

Leyou Finishing, "PlayerUnknown's Battlegrounds Shooting Skills How to Aim and Hit Strategy", May 31, 2017, 3 pgs.

PlayerUnknown, "Linkin Eat Chicken, PUBG Beginner Tutorial Issue 4: Shooting", Nov. 6, 2021, 3 pgs., Retrieved from the Internet: https://www.bilibili.com/video/av16070433?from=search&seid=13423406249092890090.

"PlayerUnknown's Battlegrounds SLR Aiming and Shooting Skills Introduction", May 15, 2018, 6 pgs., Retrieved from the Internet: https://m.gmz88.com/gonglue/118938.html.

Tencent Technology, WO, PCT/CN2019/080971, Jul. 2, 2019, 5 pgs.

Tencent Technology, IPRP, PCT/CN2019/080971, Nov. 24, 2020, 6 pgs.

\* cited by examiner

INTERFACE DISPLAY METHOD AND APPARATUS, ELECTRONIC DEVICE, AND COMPUTER-READABLE STORAGE MEDIUM

CROSS REFERENCE TO RELATED APPLICATIONS

This application is a continuation application of PCT Patent Application No. PCT/CN2019/080971, entitled "INTERFACE DISPLAY METHOD AND APPARATUS, ELECTRONIC DEVICE AND COMPUTER READABLE STORAGE MEDIUM" filed on Apr. 2, 2019, which claims priority to Chinese Patent Application No. 201810480564.8, entitled "INTERFACE DISPLAY METHOD AND APPARATUS, ELECTRONIC DEVICE, AND COMPUTER-READABLE STORAGE MEDIUM" filed May 18, 2018, all of which are incorporated by reference in their entirety.

FIELD OF THE TECHNOLOGY

This application relates to the field of computer technologies, and in particular, to an interface display method and apparatus, an electronic device, and a computer-readable storage medium.

BACKGROUND OF THE DISCLOSURE

With the development of computer technologies, people can simulate a scene in real life through a simulation technology, and display a virtual scene used for simulating the real scene in a terminal interface. The simulation technology is an experimental method of building a model of a research object by using a similarity principle and indirectly studying prototype regularity through the model. For example, in a game application, people can control a virtual object to perform actions such as running, jumping, shooting, and parachuting in a virtual scene, to simulate actions of a person in real. People can further adjust a perspective to display different areas in the virtual scene in the interface.

Currently, in a conventional interface display method, when a perspective rotation operation is detected, a virtual scene is controlled to change with the perspective rotation operation. However, in the virtual scene, rotation of a virtual item currently controlled by a virtual object is synchronized with rotation of a perspective, and therefore, a position of the virtual item in an interface does not change. Consequently, a change of a real scene cannot be realistically simulated, and a display effect is poor.

SUMMARY

Embodiments of this application provide an interface display method and apparatus, an electronic device, and a computer-readable storage medium.

An interface display update method, performed by an electronic device, includes:

displaying a virtual item currently controlled by a virtual object in a virtual scene;

detecting a perspective rotation operation associated with the virtual object;

obtaining a target rotation angle, a first rotation speed of a perspective of the virtual object, and a second rotation speed of the virtual item according to the perspective rotation operation, the second rotation speed being less than the first rotation speed; and updating the virtual scene, based on the target rotation angle, the first rotation speed of the perspective of the virtual object, and the second rotation speed of the virtual item, using a target animation in a scene interface in which the virtual scene changes in accordance with the perspective rotation operation, the target animation visualizing an effect that rotation of the virtual item lags behind rotation of the perspective of the virtual object.

An electronic device includes a processor and a memory, the memory storing computer-executable instructions, the computer-executable instructions, when executed by the processor, causing the electronic device to perform the following operations:

displaying a virtual item currently controlled by a virtual object in a virtual scene;

detecting a perspective rotation operation associated with the virtual object;

obtaining a target rotation angle, a first rotation speed of a perspective of the virtual object, and a second rotation speed of the virtual item according to the perspective rotation operation, the second rotation speed being less than the first rotation speed; and updating the virtual scene, based on the target rotation angle, the first rotation speed of the perspective of the virtual object, and the second rotation speed of the virtual item, using a target animation in a scene interface in which the virtual scene changes in accordance with the perspective rotation operation, the target animation visualizing an effect that rotation of the virtual item lags behind rotation of the perspective of the virtual object.

A non-transitory computer-readable storage medium stores computer-executable instructions, the computer-executable instructions, when executed by a processor of an electronic device, causing the electronic device to perform the following operations:

displaying a virtual item currently controlled by a virtual object in a virtual scene;

detecting a perspective rotation operation associated with the virtual object;

obtaining a target rotation angle, a first rotation speed of a perspective of the virtual object, and a second rotation speed of the virtual item according to the perspective rotation operation, the second rotation speed being less than the first rotation speed; and updating the virtual scene, based on the target rotation angle, the first rotation speed of the perspective of the virtual object, and the second rotation speed of the virtual item, using a target animation in a scene interface in which the virtual scene changes in accordance with the perspective rotation operation, the target animation visualizing an effect that rotation of the virtual item lags behind rotation of the perspective of the virtual object.

Details of one or more embodiments of this application are provided in the accompany drawings and description below. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 7(*b*) is a flowchart of step S703 according to an embodiment of this application.

DESCRIPTION OF EMBODIMENTS

Figure 1:
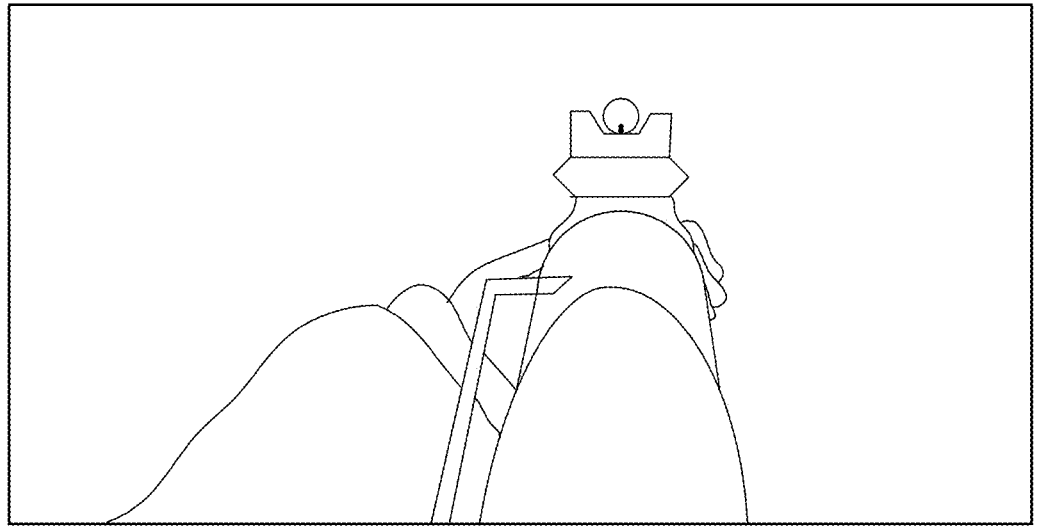
FIG. 1 is a schematic diagram of a terminal interface according to an embodiment of this application.

To make the objectives, technical solutions, and advantages of this application clearer, the following further describes the implementations of this application in detail with reference to the accompanying drawings.

Embodiments of this application are mainly related to an electronic game or simulated training scenario. For example, in the electronic game scenario, a user may perform an operation on a terminal in advance, and the terminal may download a game configuration file of an electronic game after detecting the operation of the user, so that the user may invoke the game configuration file when logging in to the electronic game on the terminal, to render and display an interface of the electronic game. The game configuration file may include an application program, interface display data, virtual scene data, and the like of the electronic game. The user may perform a touch operation on the terminal. After detecting the touch operation, the terminal may determine game data corresponding to the touch operation, and render and display the game data. The game data may include virtual scene data, behavioral data of a virtual object in a virtual scene, and the like.

The virtual scene involved in this application may be used for simulating a three-dimensional virtual space or a two-dimensional virtual space, which may be an open space. The virtual scene may be used for simulating a real environment in reality. For example, the virtual scene may include sky, land, and ocean, and the land may include environmental elements such as desert and city. A user may control a virtual object to move in the virtual scene. The virtual object may be an avatar for representing the user in the virtual scene. The avatar may be in any form, for example, human or animal, which is not limited in this application. The virtual scene may include a plurality of virtual objects. Each virtual object has a respective shape and size in the virtual scene, occupying a part of space in the virtual scene.

For example, in a shooting game, a user may control a virtual object to fall freely, glide, parachute, or the like in sky of the virtual scene, or run, jump, crawl, walk in a stooped posture, or the like on land, or may control a virtual object to swim, float, dive, or the like in ocean. Certainly, the user may alternatively control a virtual object to ride a vehicle to move in the virtual scene. Herein, the scenes are merely used as examples, and no specific limitations are set in the embodiments of this application. The user may alternatively control a virtual object to fight against another virtual object by using a weapon. The weapon may be a cold weapon, or may be a hot weapon, which is not specifically limited in this application.

In the electronic game scenario or the simulated training scenario, a camera model is generally provided. The camera model may be a three-dimensional model located around a virtual object in a three-dimensional virtual environment, or may be a two-dimensional model in a two-dimensional virtual scene, which is not specifically limited in the embodiments of this application. A virtual scene displayed in a terminal interface is a virtual scene that can be shot by a camera of the camera model, or it may be understood that the camera of the camera model is a viewpoint to the virtual scene. An orientation of the camera is an orientation of a perspective.

A user may perform a perspective rotation operation on a terminal. When detecting the perspective rotation operation, the terminal may control, according to the perspective rotation operation, the perspective to rotate. Specifically, the terminal may control the camera to rotate. Correspondingly, when the camera is rotated, a virtual scene that can be shot by the camera also changes, that is, a displayed area of the virtual scene becomes different. The perspective rotation operation may be a movement operation on a mouse, a push-button operation, a slide operation on a terminal screen, or other operations, for example, operation manners such as a gyroscope and 3D touch, which is not limited in the embodiments of this application.

Specifically, a rotation direction of the perspective may be consistent with a direction indicated by the perspective rotation operation, and a rotation speed of the perspective may be in a positive correlation with an operation speed of the perspective rotation operation, that is, a larger operation speed indicates a larger rotation speed. A determining manner for a rotation angle of the perspective varies with different operation manners. For example, if the perspective rotation operation is a movement operation on a mouse, a slide operation, or a gyroscope operation manner, the rotation angle of the perspective may be in a positive correlation with an operation distance or an operation amplitude of the perspective rotation operation. That is, a larger operation distance or operation amplitude indicates a larger rotation angle. If a perspective rotation operation is a push-button operation or a 3D touch operation manner, the rotation angle of the perspective may be in a positive correlation with an operation duration or an operation force of the perspective rotation operation. That is, a larger operation duration or operation force indicates a larger rotation angle. Certainly, the rotation angle of the perspective may alternatively be in a negative correlation with the operation force, that is, a larger operation force indicates a smaller rotation angle. This is not limited in the embodiments of this application.

Correspondingly, a determining manner of determining a perspective rotation parameter according to a perspective rotation operation may be preset in the terminal. The perspective rotation parameter is the rotation direction, the rotation angle, the rotation speed, or the like of the perspective. When detecting the perspective rotation operation, the terminal may determine the rotation direction, the rotation angle, the rotation speed, or the like of the perspective according to a determining manner corresponding to a specific operation manner. The perspective rotation operation may be preset by a person skilled in the art, or may be adjusted by a user according to usage habits of the user, which is not specifically limited in the embodiments of this application.

Generally, in a shooting game, display of a virtual scene may include two display manners, that is, two camera modes: a first-person perspective and a third-person perspective. The first-person perspective is used for simulating a case that a virtual scene is viewed from a perspective of a virtual object. In the camera mode of the first-person perspective, a camera may be generally located at eyes of the virtual object, or in an area near the eyes of the virtual object, for example, the head or the chest of the virtual object. The third-person perspective is used for simulating a case that a virtual scene is viewed from a position around a virtual object. In the camera mode of the third-person perspective, a camera may be generally located behind the virtual object, to display the virtual object in the virtual scene, so that a user may see an action of the virtual object and an environment in which the virtual object is located in the virtual scene.

Figure 2:
FIG. 2 is a diagram of an actual terminal interface according to an embodiment of this application.
Figure 3:
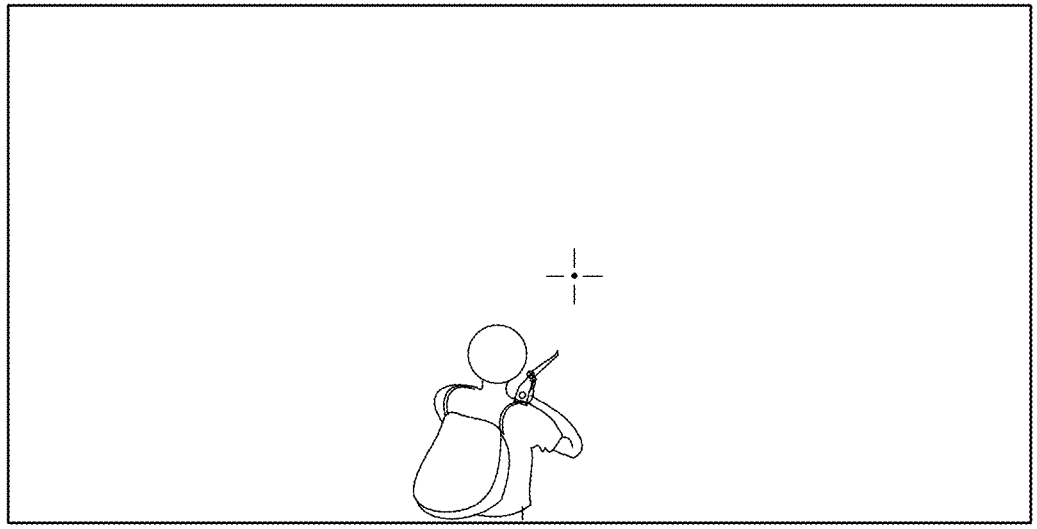
FIG. 3 is a schematic diagram of a terminal interface according to an embodiment of this application.
Figure 4:
FIG. 4 is a diagram of an actual terminal interface according to an embodiment of this application.

For example, FIG. 1 shows a first-person perspective. In the first-person perspective, because a camera is located in an area near eyes of a virtual object, for example, the chest, when a virtual scene viewed through the camera is displayed in an interface, arms and hands of the virtual object and an item being used by the virtual object can be displayed. In an actual terminal interface, the first-person perspective is shown in FIG. 2. FIG. 3 shows a third-person perspective. Because a camera is located behind a virtual object, a virtual scene displayed in an interface may include the virtual object. In this way, the virtual object, an item being used by the virtual object, and the like may be seen in the interface. In an actual terminal interface, as shown in FIG. 4, the third-person perspective may display a condition of a virtual object.

Certainly, a camera orientation of the camera, that is, a perspective orientation, is generally parallel to a perspective orientation of the virtual object. In a possible implementation, when a user intends to adjust a currently displayed virtual scene by only adjusting a perspective orientation without changing a posture of a virtual object, a terminal may further control, according to a touch operation of the user, a camera to rotate around the virtual object with a vertical direction of the virtual object in a three-dimensional coordinate system as a central axis. Certainly, in another possible implementation, the terminal may not change a position of the camera, but only change a camera orientation of the camera. This is not limited in the embodiments of this application.

Figure 5:
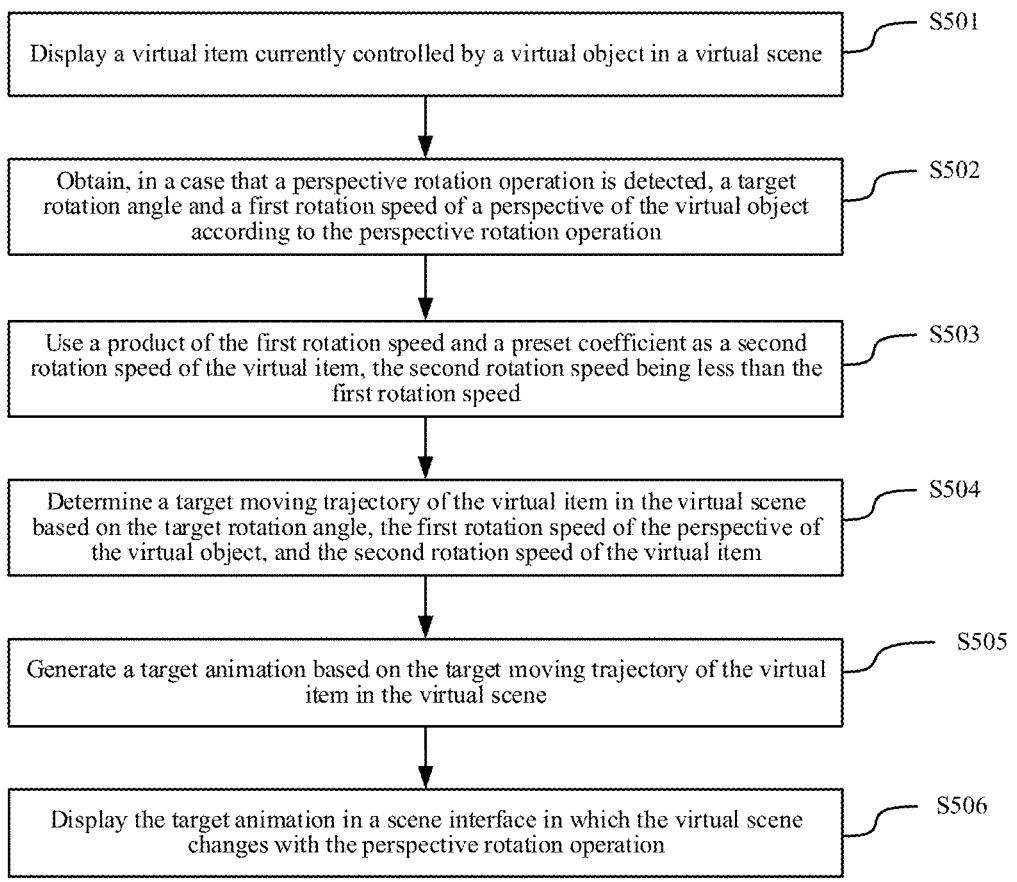
FIG. 5 is a flowchart of an interface display method according to an embodiment of this application.

FIG. 5 is a flowchart of an interface display method according to an embodiment of this application. Referring to FIG. 5, the method may include the following steps:

S501. Display a virtual item currently controlled by a virtual object in a virtual scene.

In an electronic game scenario or a simulated training scenario, a terminal may display a virtual scene in an interface and display a virtual item currently controlled by a virtual object in the virtual scene, and may further display the virtual object or a partial area of the virtual object in the interface.

Certainly, the terminal may further display other information of the virtual object in the interface, for example, a health value of the virtual object or a name of the virtual object, or may display information about a virtual item of the virtual object in the interface, for example, a virtual item currently controlled by the virtual object and a virtual item owned by the virtual object but currently not controlled by the virtual object, information about the virtual item currently controlled by the virtual object, or information of the virtual item currently not controlled by the virtual object. Display content on the terminal interface is not specifically limited in this embodiment of this application.

Specifically, different item models may be preset in the terminal. When displaying the virtual item currently controlled by the virtual object, the terminal may display an item model corresponding to the virtual item. For example, in the electronic game scenario, assuming that a virtual item currently controlled by a virtual object is a gun item, a terminal may display a gun model corresponding to the gun item in a game interface and display a partial area of the virtual object, for example, hands or arms, to indicate that the virtual object is controlling the gun item.

S502. Obtain, in a case that a perspective rotation operation associated with the virtual object is detected, a target rotation angle and a first rotation speed of a perspective of the virtual object according to the perspective rotation operation.

In this embodiment of this application, a user may perform a perspective rotation operation on the terminal to adjust a perspective, and when detecting the perspective rotation operation, the terminal may determine a target rotation angle and a first rotation speed of the perspective according to the perspective rotation operation.

Specifically, the terminal may determine the target rotation angle according to at least one of an operation distance, an operation amplitude, an operation duration, or an operation force of the perspective rotation operation, which may be specifically preset by a person skilled in the art according to different operation manners or may be set by the user according to usage habits of the user, and is not limited in this embodiment of this application. The terminal may further determine the first rotation speed of the perspective according to an operation speed of the perspective rotation operation. The first rotation speed is in a positive correlation with the operation speed. Certainly, the terminal may further determine a rotation direction of the perspective according to a direction indicated by the perspective rotation operation.

For example, the perspective rotation operation is a movement operation on a mouse. When detecting the movement operation on the mouse, the terminal may determine a rotation direction of a perspective according to a movement direction of the mouse, determine the target rotation angle of the perspective according to a movement distance of the mouse, and determine the first rotation speed of the perspective according to a movement speed of the mouse.

Different sensitivity may be preset in the terminal, and the terminal may determine the target rotation angle and the first rotation speed of the perspective according to sensitivity in a current camera mode. Certainly, if a virtual scene is in a scope-based zoom display mode, the terminal may obtain sensitivity in the current display mode, and determine the target rotation angle and the first rotation speed according to the sensitivity. This is not limited in this embodiment of this application.

S503. Use a product of the first rotation speed and a preset coefficient as a second rotation speed of the virtual item, the second rotation speed being less than the first rotation speed.

In a real scene, a person is subject to different resistance when moving in different environments, for example, air resistance on land and water resistance in water. Therefore, if a person turns with a weapon, the weapon, affected by resistance, may not keep up with body rotation of the person during rotation, that is, rotation of the weapon lags behind turning of the person. To realistically simulate the real scene, after determining the target rotation angle and the first rotation speed of the perspective in step S502, the terminal may further obtain a speed less than the first rotation speed as a second rotation speed of the virtual item. The second rotation speed is less than the first rotation speed. In this way, the lag effect may be simulated. Certainly, a rotation angle of the virtual item is the same as that of the perspective, both of which are the target rotation angle.

Specifically, the terminal may obtain a product of the first rotation speed and a preset coefficient as the second rotation speed. The preset coefficient is less than 1. For example, if the preset coefficient may be 0.8, and the first rotation speed obtained by the terminal is 30 degrees per second, the terminal may use a product of 30 degrees per second and 0.8, which is 24 degrees per second, as the second rotation speed. The foregoing is merely an example for description of obtaining the second rotation speed by the terminal. The preset coefficient may be preset by a person skilled in the art, and a specific value of the preset coefficient is not limited in this embodiment of this application.

Step S502 and step S503 are a process of obtaining, by a terminal in a case that a perspective rotation operation is detected, a target rotation angle, a first rotation speed of a perspective, and a second rotation speed of the virtual item according to the perspective rotation operation. The second rotation speed is less than the first rotation speed. In this way, rotation of the virtual item is slower than rotation of the perspective, so that it may be reflected that the rotation of the virtual item is affected by resistance, and the real scene may be simulated realistically. Only a manner of obtaining the second rotation speed through the first rotation speed is used as an example for description above. In a possible implementation, in the process, different rotation speed determining manners may be respectively set for rotation of a perspective and a virtual item in the terminal, which are manners of how to obtain a rotation speed through an operation speed of a perspective rotation operation. For the same perspective rotation operation, in the two determining manners, the rotation speed of the perspective is greater than the rotation speed of the virtual item. In another possible implementation, when obtaining the second rotation speed of the virtual item, the terminal may further calculate the second rotation speed by using an algorithm similar to a spring algorithm, so that the rotation of the virtual item lags behind the rotation of the perspective. A specific used implementation is not limited in this embodiment of this application.

S504. Determine a target movement trajectory of the virtual item in the virtual scene based on the target rotation angle, the first rotation speed of the perspective, and the second rotation speed of the virtual item.

When a perspective rotates, that is, a camera rotates, a virtual scene viewed through the perspective or the camera also changes, and a virtual item also rotates. Therefore, the terminal may determine a target movement trajectory of the virtual item in the virtual scene based on related parameters of the rotation of the perspective and the rotation of the virtual item that are determined by the terminal and determine, based on the target movement trajectory, how to display a movement status of the virtual item in the interface.

Specifically, the terminal obtains a position change status of the virtual item in the virtual scene when the perspective rotates the target rotation angle according to the first rotation speed and the virtual item rotates the target rotation angle according to the second rotation speed. Certainly, the terminal may alternatively obtain a position of the virtual item in the virtual scene at a preset time interval, and determine the position change status, that is, the target movement trajectory, of the virtual item in the virtual scene based on a plurality of obtained positions.

The preset time interval may be preset by a person skilled in the art, or may be adjusted by the user according to a configuration status of the terminal, which is not limited in this embodiment of this application.

S505. Generate a target animation based on the target movement trajectory of the virtual item in the virtual scene.

The target animation is used for reflecting an effect that the rotation of the virtual item lags behind the rotation of the perspective. The rotation speed of the virtual item is different from the rotation speed of the perspective, and a displayed position of the virtual item in the interface may change. Therefore, after determining the target movement trajectory of the virtual item in the virtual scene, the terminal may determine a change of the virtual scene based on the rotation of the perspective, and determine, according to the target movement trajectory, a specific display status of the virtual item in the interface when the virtual scene changes.

Specifically, the terminal may determine a change of a displayed area of the virtual scene according to a rotation status of the perspective, and when the change of the displayed area of the virtual scene is determined, the virtual item moves according to the target movement trajectory. The terminal may generate a target animation according to to-be-displayed content in the interface of the terminal within a duration of the change, and display the target animation in the interface to reflect actual changes of the virtual scene and the virtual item in the interface.

S506. Display the target animation in a scene interface in which the virtual scene changes with the perspective rotation operation.

The terminal may display that the virtual scene changes with the perspective rotation operation in a scene interface and display the target animation determined in step S505 in the scene interface, so that the effect that the rotation of the virtual item lags behind the rotation of the perspective may be reflected in the interface.

For example, when the terminal performs step S506, the user may see, in the interface, that the virtual scene changes as the perspective rotation operation starts and the position of the virtual item currently controlled by the virtual object also starts to change. However, because the rotation speed of the virtual item is smaller, it may be seen that the virtual item moves toward an opposite direction of the perspective rotation operation, and the position of the virtual item still changes when the perspective rotation operation stops and the virtual scene no longer changes. At the stop time, a movement direction of the virtual item becomes a direction of the perspective rotation operation until the virtual item returns to the position of the virtual item in the interface before the perspective rotation operation.

Step S504 to step S506 is a process of displaying, based on the target rotation angle, the first rotation speed of the perspective, and the second rotation speed of the virtual item, a target animation in a scene interface in which the virtual scene changes with the perspective rotation operation.

In an embodiment, the terminal may obtain the position of the virtual item in the virtual scene displayed in the interface at a preset time interval, generate a target animation based on a plurality of to-be-displayed pictures, and display the target animation in the interface.

In an embodiment, the terminal may obtain to-be-displayed content, that is, the displayed area of the virtual scene and the position of the virtual item, in the interface at a preset time interval, and display the to-be-displayed content in the interface in sequence. The preset time interval may be preset by a person skilled in the art, or may be adjusted by the user according to a configuration status of the terminal, which is not limited in this embodiment of this application.

In an embodiment, a lag degree of the rotation of the virtual item relative to the rotation of the perspective may vary with different camera modes. In this embodiment of this application, the camera modes may include a first-person perspective and a third-person perspective. Certainly, the camera mode may further include a second-person perspective. This is not limited in this embodiment of this application. To more realistically simulate a change of a scene viewed through a perspective of a virtual object in the camera mode of the first-person perspective, the terminal may include the following setting: In different camera modes, lag degrees of rotation of a virtual item relative to rotation of a perspective may be different. The lag degree is reflected as a difference between the first rotation speed and the second rotation speed. In a possible implementation, the lag degree may be in a negative correlation with the preset coefficient in step S503, that is, a larger preset coefficient indicates a smaller lag degree.

Correspondingly, before performing step S503, the terminal may detect a current camera mode, and obtain, according to the current camera mode, a preset coefficient corresponding to the current camera mode. Certainly, if the lag degree is implemented through another parameter, the terminal may alternatively determine, according to the current camera mode, a parameter corresponding to the current camera mode. An implementation of the lag degree is not limited in this embodiment of this application.

For example, a preset coefficient in the camera mode of the first-person perspective may be a first preset coefficient, a preset coefficient in the camera mode of the third-person perspective may be a second preset coefficient, and the first preset coefficient is less than the second preset coefficient. Before performing step S503, the terminal may further obtain a preset coefficient corresponding to the current camera mode. If the camera mode is the first-person perspective, the terminal may obtain the first preset coefficient. If the current camera mode is the third-person perspective, the terminal may obtain the second preset coefficient. Then the terminal may perform step S503 to obtain the second rotation speed of the virtual item.

In an embodiment, a lag degree of the rotation of the virtual item relative to the rotation of the perspective may also vary with different movement states of the virtual object. The movement states of the virtual object refer to movement manners of the virtual object in the virtual scene. For example, the movement states may include staying still, walking, running, swimming, jumping, squatting, crawling, flying, and riding a vehicle. Certainly, the movement state may further include other movement manners, which are not listed one by one in this embodiment of this application. In different movement states of the virtual object, the virtual object may be subject to different resistance. Therefore, the rotation of the virtual item relative to the rotation of the perspective may be set to have different lag degrees. For example, for the lag degree of the rotation of the virtual item relative to the rotation of the perspective, the lag degree when the virtual object rides a vehicle may be greater than that when the virtual object is staying still, so that a case that resistance to which a person is subject when the person rides a vehicle is greater than that when the person is staying still may be simulated.

Similarly, the lag degree may be implemented by setting different preset coefficients corresponding to different movement states in the terminal, and details are not further described in this embodiment of this application. Correspondingly, before performing step S503, the terminal may detect a current movement state of the virtual object in the virtual scene, and obtain, according to the current movement state, a preset coefficient corresponding to the current movement state. Certainly, if the lag degree is implemented through another parameter, the terminal may alternatively determine, according to the current movement state, a parameter corresponding to the current movement state. An implementation of the lag degree is not limited in this embodiment of this application. In a possible implementation, the terminal may alternatively detect a movement state and a movement speed of the virtual object in the virtual scene, and obtain a preset coefficient or another parameter corresponding to the movement speed in the movement state. This is not limited in this embodiment of this application.

In an embodiment, a lag degree of the rotation of the virtual item relative to the rotation of the perspective may also vary with different ambient environments of the virtual object. The ambient environments of the virtual object may include land, water, and the like. Certainly, the ambient environments of the virtual object may further include sand, grass, room, or the like. This is not limited in this embodiment of this application. In different ambient environments of the virtual object, the virtual object may be subject to different resistance. Therefore, the rotation of the virtual item relative to the rotation of the perspective may be set to have different lag degrees. For example, for the lag degree of the rotation of the virtual item relative to the rotation of the perspective, the lag degree when the virtual object is in water may be greater than that when the virtual object is on land, so that a case that resistance in water is greater than that in air in a real scene may be simulated.

Similarly, the lag degree may be implemented by setting different preset coefficients corresponding to different environments in the terminal, and details are not further described in this embodiment of this application. Correspondingly, before performing step S503, the terminal may detect an ambient environment of the virtual object in the virtual scene, and obtain, according to the ambient environment, a preset coefficient corresponding to the ambient environment. Certainly, if the lag degree is implemented through another parameter, the terminal may alternatively determine, according to the ambient environment, a parameter corresponding to the ambient environment. An implementation of the lag degree is not limited in this embodiment of this application.

In an embodiment, a lag degree of the rotation of the virtual item relative to the rotation of the perspective varies with different item types of the virtual item currently controlled by the virtual object. The item types may include a shooting class, a throwing class, or a fight class. Certainly, the item types may further include other types, which are not listed herein one by one. For different item types of the virtual item, the virtual object may be subject to different resistance. Therefore, the rotation of the virtual item relative to the rotation of the perspective may be set to have different lag degrees. For example, for the lag degree of the rotation of the virtual item relative to the rotation of the perspective, the lag degree in a case of the shooting class may be greater than that in a case of the throwing class, so that a case that resistance to which a person is subject when the person uses a shooting weapon is greater than that when the person uses a throwing weapon in a real scene may be simulated. In an embodiment, a lag degree of the rotation of the virtual item relative to the rotation of the perspective of the virtual object is a function of the target rotation angle and the first rotation speed of the perspective of the virtual object. For example, the greater the target rotation angle and the first rotation speed of the perspective of the virtual object, the higher the lag degree of the rotation of the virtual item relative to the rotation of the perspective of the virtual object.

Similarly, the lag degree may be implemented by setting different preset coefficients corresponding to different item types in the terminal, and details are not further described in this embodiment of this application. Correspondingly, before performing step S503, the terminal may detect an item type of the virtual item currently controlled by the virtual object, and obtain, according to the item type, a preset coefficient corresponding to the item type. Certainly, if the lag degree is implemented through another parameter, the terminal may alternatively determine, according to the item type, a parameter corresponding to the item type. An implementation of the lag degree is not limited in this embodiment of this application.

In an embodiment, a lag degree of the rotation of the virtual item relative to the rotation of the perspective may also vary with different virtual items. Different virtual items may have different weights, shapes, or sizes, and therefore, the virtual item may be subject to different resistance. Therefore, different virtual items may also be set to correspond to different preset coefficients, and details are not further described in this embodiment of this application. For example, for the lag degree of the rotation of the virtual item relative to the rotation of the perspective, assuming that resistance to which a submachine gun is subject is less than resistance to which a rifle is subject, a lag degree when the virtual item currently controlled by the virtual object is the submachine gun may be less than a lag degree when the virtual item currently controlled by the virtual object is the rifle.

Similarly, the lag degree may be implemented by setting different virtual items corresponding to different preset coefficients in the terminal, and details are not further described in this embodiment of this application. Correspondingly, before performing step S503, the terminal may detect the virtual item currently controlled by the virtual object, and obtain, according to the virtual item, a preset coefficient corresponding to the virtual item. Certainly, if the lag degree is implemented through another parameter, the terminal may alternatively determine, according to the virtual item, a parameter corresponding to the virtual item. An implementation of the lag degree is not limited in this embodiment of this application.

Specifically, a correspondence between identification information of different virtual items and a preset coefficient or another parameter may be alternatively preset in the terminal, so that when detecting the virtual item currently controlled by the virtual object, the terminal may obtain identification information, and obtain a preset coefficient or another parameter corresponding to the identification information according to the identification information. The identification information may be a name, a number, or the like of the virtual item, which is not specifically limited in this embodiment of this application.

The terminal may determine the lag degree of the rotation of the virtual item relative to the rotation of the perspective according to any one or any combination of the foregoing possible implementations, which is not limited in this embodiment of this application. For example, for the lag degree of the rotation of the virtual item relative to the rotation of the perspective, a lag degree when the item type of the virtual item currently controlled by the virtual object is the shooting class and the virtual object is running may be greater than a lag degree when the item type of the virtual item currently controlled by the virtual object is the throwing class and the virtual object is on land.

In an embodiment, the terminal may further include the following setting: For the effect that the rotation of the virtual item lags behind the rotation of the perspective, when determining that a camera mode is the first-person perspective, the terminal performs steps S502 and S503. Otherwise, when performing step S502, the terminal may determine that both a rotation angle of the perspective and a rotation angle of the virtual item are the target rotation angle, and determine that a rotation speed of the perspective and a rotation speed of the virtual item are consistent. In this case, there is no lag effect between the rotation of the virtual item and the perspective. A specific used implementation is not limited in this embodiment of this application.

In this embodiment of this application, when a perspective rotation operation is detected, the same rotation angle of a perspective and a virtual item currently controlled by a virtual object is obtained, and a first rotation speed of the perspective and a second rotation speed of the virtual item are obtained, the second rotation speed being less than the first rotation speed. In this way, the perspective and the virtual item rotate the same angle, but rotation of the virtual item is slower than rotation of the perspective. When displaying corresponding content in an interface according to the perspective rotation operation, a terminal may display an effect that the rotation of the virtual item lags behind the rotation of the perspective, so that a change of a scene when a person is subject to resistance when turning with a weapon may be realistically simulated, and a display effect is good.

All the foregoing optional technical solutions may be arbitrarily combined to form an optional embodiment of this application, and details are not described herein.

The foregoing embodiment merely describes a case that when the perspective rotation operation is detected, the rotation angle of the perspective and the rotation angle of the virtual item may be determined, and the rotation speed of the perspective and the rotation speed of the virtual item may be determined, so that the effect that the rotation of the virtual item lags behind the rotation of the perspective may be displayed in the interface. The perspective is rotated according to the perspective rotation operation by rotating a camera.

In an embodiment, to realistically simulate a case that a scene viewed by a person shakes due to human breathing, muscle contraction and extension, or body balance, the terminal may further control the camera to shake, so that the virtual scene displayed in the interface shakes with the camera. In this way, a change of a scene when a person is in different states and in different environments may be realistically simulated. This implementation is described below in detail by using an embodiment shown in FIG. 6.

Figure 6:
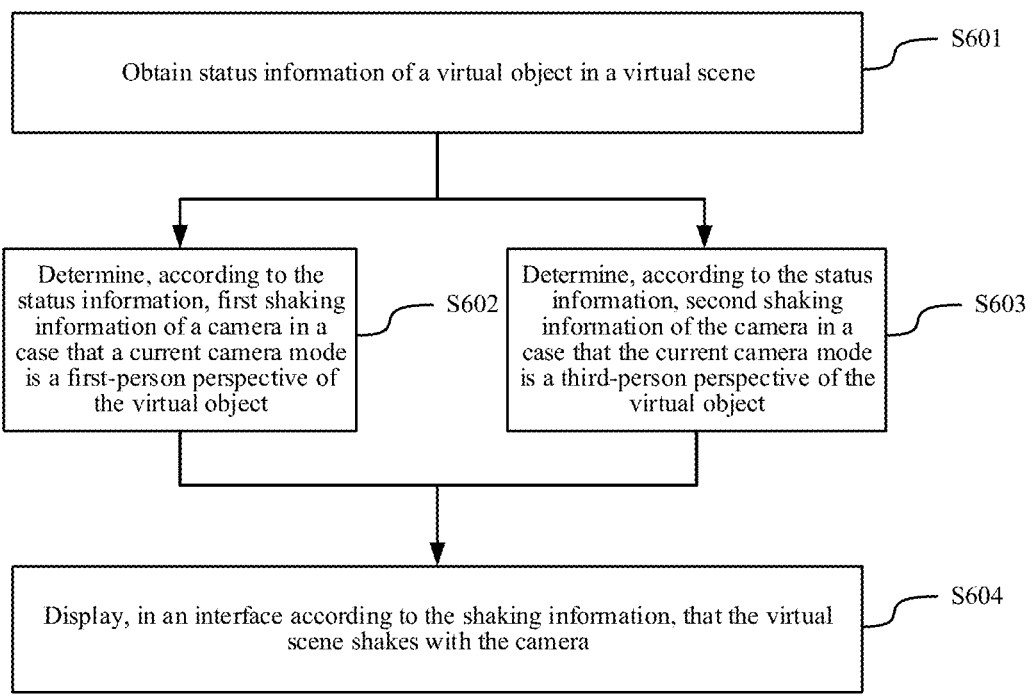
FIG. 6 is a flowchart of an interface display method according to an embodiment of this application.

FIG. 6 is a flowchart of an interface display method according to an embodiment of this application. Referring to FIG. 6, the method may include the following steps:

S601. Obtain status information of a virtual object in a virtual scene.

In this embodiment of this application, to simulate a change of a virtual scene viewed by a person in different states in a real scene, a terminal needs to obtain status information of a virtual object in the virtual scene. The status information may include at least one of a movement state of the virtual object, an ambient environment of the virtual object, and an item type of a virtual item currently controlled by the virtual object. Certainly, the status information may further include other information. This is not limited in this embodiment of this application.

The movement state of the virtual object refers to a movement manner of the virtual object in the virtual scene. For example, the movement state may include staying still, walking, running, swimming, jumping, squatting, crawling, flying, riding a vehicle, or the like. Certainly, the movement state may further include other movement manners, which are not listed one by one in this embodiment of this application. The ambient environment of the virtual object may be on land, in water, or the like. Certainly, the ambient environment of the virtual object may further include on sand, on grass, in room, or the like. This is not limited in this embodiment of this application. The item type of the virtual item currently controlled by the virtual object may include a shooting class, a throwing class, or a fight class. Certainly, the item type may further include other types, which are not listed herein one by one.

S602. Determine, according to the status information, first shaking information of a camera in a case that a current camera mode is a first-person perspective of the virtual object.

In different camera modes, shaking information of the camera may be different. Because a camera corresponding to a first-person perspective is a subjective camera of a virtual object, a state of the virtual object greatly affects shaking of the camera. Because a camera corresponding to a third-person perspective is an objective camera of a virtual object, which is an objective angle to view the virtual object and an ambient environment of the virtual object, a state of the virtual object slightly affects shaking of the camera.

Specifically, the terminal may first determine a camera mode, and then determine shaking information corresponding to the current status information of the virtual object according to a correspondence between status information of a virtual object and shaking information of a camera in the current camera mode. The shaking information may include at least one selected from combinations including a shaking direction, a shaking amplitude, and a shaking speed. That is, the terminal may determine a shaking direction, a shaking amplitude, and a shaking speed of the camera according to the camera mode and the status information. For example, the shaking direction may be an up-and-down direction or a horizontal direction, or because there is shaking in both the up-and-down direction and the horizontal direction, a plurality of shaking directions may be combined into a mixed direction. The shaking amplitude and the shaking speed may be further used for measuring a shaking degree of the camera. The shaking amplitude may be in a positive correlation with the shaking degree, and the shaking speed may also be in a positive correlation with the shaking degree. That is, a larger shaking amplitude indicates a larger shaking degree, and a larger shaking speed indicates a larger shaking degree.

When the status information of the virtual object is different, the shaking information of the camera may be different. Specifically, in different movement states of the virtual object, the shaking information of the camera may be different. For example, a shaking degree of the camera when the virtual object is running may be greater than that when the virtual object is walking. In different ambient environment of the virtual object, the shaking information of the camera may also be different. For example, a shaking degree of the camera when the virtual object is in water may be greater than that when the virtual object is on land. For different item types of the virtual item currently controlled by the virtual object, the shaking information of the camera may also be different. For example, if the virtual object currently fights against an enemy with a gun weapon, that is, if the item type of the virtual item currently controlled by the virtual object is the shooting class, a camera may be set to shake accordingly because the gun weapon generally has a recoil force, which means that when the gun is fired, a bullet shell, under pressure of gunpowder gas, pushes a gunlock to recoil, the gunlock recoiling hits a frame connected with a butt to make a gun body move backward, and when the gun body moves, the gun body acts on the virtual object, so that both the virtual object and the gun move. However, if the item type of the virtual item currently controlled by the virtual object is the throwing class, because a throwing item generally have no recoil force when being used, the shaking degree of the camera may be set to be very small, almost zero. In a possible implementation, the shaking information of the camera may also vary with different virtual items currently controlled by the virtual object. In this implementation, because recoil forces of different gun weapons are also different, the camera may be set to have different shaking degree.

In an embodiment, two camera modes may be implemented through two camera models in the terminal, and correspondingly, in step S602, the terminal may determine which camera model is currently being used to determine the current camera mode. For example, the terminal may obtain identification information of the camera model currently being used, and determine the current camera mode by using the identification information. Certainly, the two camera modes may alternatively be implemented by changing a position of one camera model in the terminal, and correspondingly, the terminal may obtain a position of the current camera model relative to the virtual object, and determine the current camera mode according to the position. This is not limited in this embodiment of this application.

In an embodiment, a correspondence between a camera mode, status information of a virtual object, and shaking information may be preset in the terminal, and the terminal may obtain corresponding shaking information from the correspondence according to a current camera mode and obtained status information.

In an embodiment, a conversion relationship between a camera mode, status information of a virtual object, and shaking information may be alternatively preset in a terminal, and the terminal may convert a current camera mode and status information of a virtual object into shaking information of a camera by using the conversion relationship. For example, the conversion relationship may be an algorithm of obtaining shaking information according to a current camera mode and status information, and the terminal may calculate based on a determined current camera mode and obtained status information of a virtual object by using the algorithm to obtain shaking information. The correspondence and the conversion relationship may be preset by a person skilled in the related art. An implementation specifically used in actual application and the correspondence and the conversion relationship in the implementations are not specifically limited in this embodiment of this application.

When determining that the current camera mode is the first-person perspective of the virtual object, the terminal may perform step S602, that is, determine the first shaking information of the camera according to the status information by using any one of the implementations. Similarly, if determining that the current camera mode is the third-person perspective of the virtual object, the terminal may perform step S603.

S603. Determine second shaking information of the camera according to the status information in a case that the current camera mode is a third-person perspective of the virtual object.

Step S603 is similar to step S602. The terminal may obtain the second shaking information of the camera according to the camera mode of the third-person perspective and the status information.

The shaking information of the camera in different camera mode may be different, which may specifically include the following two cases in this embodiment of this application:

In a first case, a shaking degree corresponding to the second shaking information is less than a shaking degree corresponding to the first shaking information.

In the first case, the terminal may include the following setting: In both camera modes, the terminal can control the camera to shake to realistically simulate scene shaking caused by problems such as human breathing, muscle contraction and extension, or body balance.

Specifically, for the same status information of the virtual object, the terminal may determine that a shaking amplitude in the second shaking information is greater than a shaking amplitude in the first shaking information, or a shaking speed in the second shaking information is greater than a shaking speed in the first shaking information, or both a shaking amplitude and a shaking speed in the second shaking information are greater than a shaking amplitude and a shaking speed in the first shaking information, which is not limited in this embodiment of this application. In this way, a real scene in which impact of a state of a person in a subjective perspective on scene shaking is greater than impact of a state of a person in an objective perspective on scene shaking may be realistically simulated.

In a second case, the second shaking information is used for indicating that the camera does not shake.

In the second case, the terminal may include the following setting: When the camera mode is the first-person perspective, the terminal may control the camera to shake. When the camera mode is the third-person perspective, the terminal does not control the camera to shake.

In this way, an effect that due to different states of a virtual object, a camera shakes and a virtual scene changes, but a camera corresponding to the third-person perspective is an objective camera and does not shake with the state of the virtual object may be simulated.

Step S602 and step S603 are a process of obtaining shaking information of a camera according to the current camera mode and the status information. If the camera mode is different or the status information of the virtual object is different, the shaking information of the camera obtained by the terminal may be different. In addition to the two cases, there may be further a third case: When the first shaking information is the same as the second shaking information, that is, the status information of the virtual object is the same, but the camera mode is different, the terminal may obtain shaking information of the same camera. A specific used cases is not specifically limited in this embodiment of this application.

S604. Display, in an interface according to the shaking information, that the virtual scene shakes with the camera.

After determining the shaking information of the camera, the terminal may control the camera to shake. When the camera shakes, the virtual scene viewed through the camera also shakes.

In an embodiment, step S604 may be as follows: The terminal controls, according to the shaking information, the camera to shake, determines a change of a displayed area of the virtual scene according to shaking of the camera, and displays a determined virtual scene in the displayed area in the interface. The virtual scene changes with the change of the displayed area.

In an embodiment, the terminal may control, according to the shaking information, the camera to shake, obtain a displayed area of a virtual scene corresponding to a current position of the camera at a preset time interval, and display obtained virtual scenes in a plurality of displayed areas in sequence in the interface. The preset time interval may be preset by a person skilled in the art, or may be adjusted by the user according to a configuration status of the terminal, which is not limited in this embodiment of this application.

In this embodiment of this application, how a camera shakes is determined according to a camera mode and status information of a virtual object in a virtual scene, and an effect that the virtual scene shakes with the camera is displayed in an interface by controlling the camera to shake, so that scene shaking seen by a person in different states in a real scene may be realistically simulated, and a display effect is better.

All the foregoing optional technical solutions may be arbitrarily combined to form an optional embodiment of this application, and details are not described herein.

In a possible implementation, in the embodiment shown in FIG. 5 or FIG. 6, the terminal can display the effect that the rotation of the virtual item with the perspective rotation operation lags behind the rotation of the perspective with the perspective rotation operation in the interface, display the effect that the shaking of the virtual scene is different when the camera mode is different or the status information of the virtual object is different in the interface, and display related information of the virtual item currently controlled by the virtual object in the interface. Details are described by using an embodiment shown in FIG. 7.

Figure 7A:
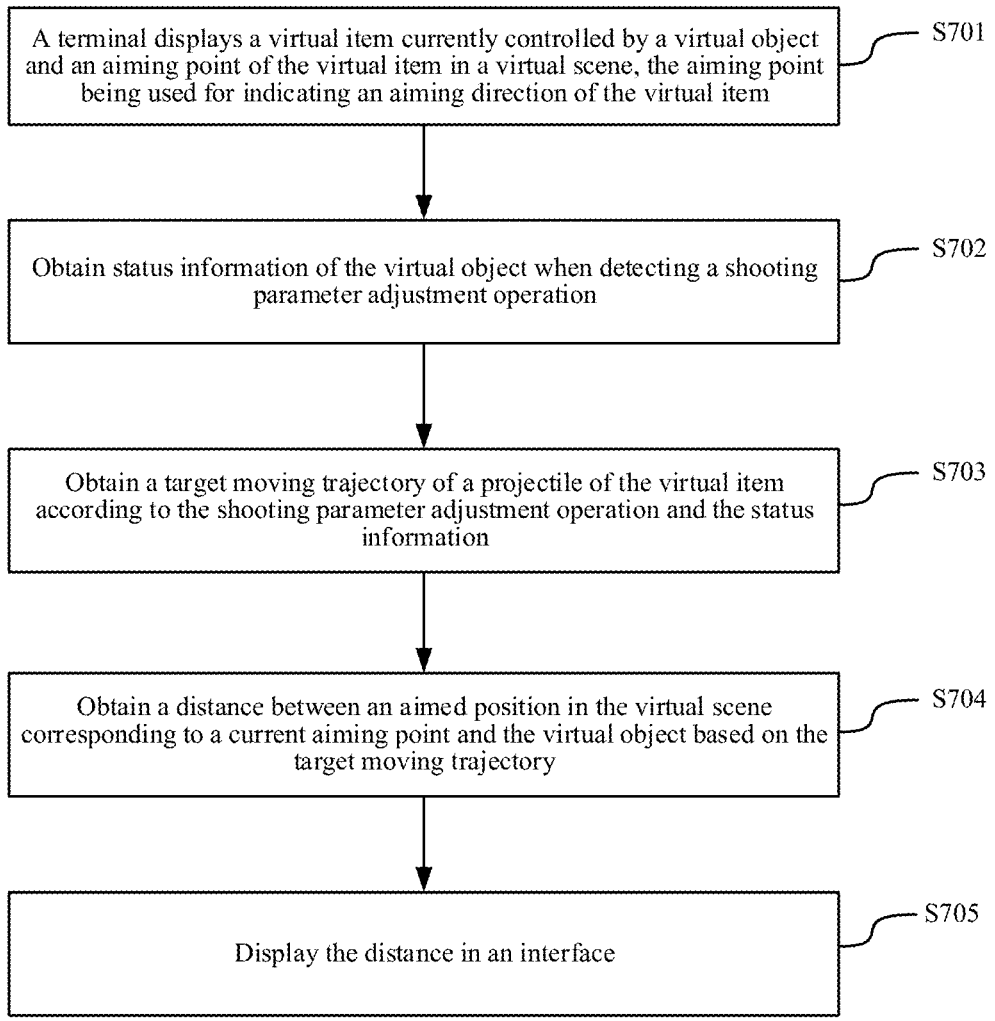
FIG. 7(*a*) is a flowchart of an interface display method according to an embodiment of this application.

FIG. 7(a) is a flowchart of an interface display method according to an embodiment of this application. Referring to FIG. 7(a), the method may include the following steps:

S701. A terminal displays a virtual item currently controlled by a virtual object and an aiming point of the virtual item in a virtual scene, the aiming point being used for indicating an aiming direction of the virtual item.

In an electronic game scenario or a simulated training scenario, a terminal may display a virtual scene in an interface and display a virtual item currently controlled by a virtual object in the virtual scene, and may further display an aiming point in the interface to indicate an aiming direction of the virtual item, and display the virtual object or a partial area of the virtual object in the interface.

Generally, the aiming point may be displayed at a center position of the terminal interface. Certainly, the aiming point may be alternatively displayed at other positions. This is not specifically limited in this embodiment of this application. There may be a plurality of display styles of the aiming point, and the aiming point may be displayed with a system default display style, or an adjustment may be made according to setting of a user. Certainly, if a scope opening operation is detected, the display style of the aiming point may be alternatively determined according to the virtual item or a scope equipped on the virtual item. This is not limited in this embodiment of this application.

In an embodiment, the user may perform a perspective rotation operation on the terminal, and the virtual scene may change according to the perspective rotation operation, so that the aiming direction of the virtual item may be changed.

S702. Obtain status information of the virtual object when detecting a shooting parameter adjustment operation.

In this embodiment of this application, different scopes may correspond to different shooting parameters. The shooting parameter may include a shooting angle of a current virtual item, and may also include magnification of a scope, and certainly may also include other information, which is not limited in this embodiment of this application.

The user may perform a shooting parameter adjustment operation on the terminal to adjust the shooting parameter, so that a target area can be more accurately aimed based on the scope. The target area is an area that the user intends to aim at. The shooting parameter adjustment operation may be a click/tap operation, or may be a scroll operation on a scroll wheel of a mouse, or may be a touch and hold operation, or certainly may be a slide operation on a specified area. An operation manner of the shooting parameter adjustment operation may be preset by a person skilled in the art, or may be customized by the user according to usage habits of the user, which is not specifically limited in this embodiment of this application.

In this embodiment of this application, the terminal may adjust, in the interface, the shooting parameter according to the shooting parameter adjustment operation, re-obtain related information of a current aiming point according to the adjusted parameter, and display the related information to assist the user in more accurately aiming at the target area.

In an embodiment, when status information of the virtual object in the virtual scene is different, when the virtual item is aimed based on a scope, a projectile of the virtual item may be subject to different resistance, a movement trajectory of the projectile of the virtual item may also be different, and related information of a current aiming point may also be different. Therefore, the terminal needs to perform step S702, that is, obtain status information of the virtual object, to obtain a target movement trajectory of the projectile of the virtual item based on the status information. The status information includes at least one of a movement state of the virtual object, an ambient environment of the virtual object, and an item type of the virtual item currently controlled by the virtual object.

The movement state of the virtual object refers to a movement manner of the virtual object in the virtual scene. For example, the movement state may include staying still, walking, running, swimming, jumping, squatting, crawling, flying, riding a vehicle, or the like. Certainly, the movement state may further include other movement manners, which are not listed one by one in this embodiment of this application. The ambient environment of the virtual object may be on land, in water, or the like. Certainly, the ambient environment of the virtual object may further include on sand, on grass, in room, or the like. This is not limited in this embodiment of this application. The item type of the virtual item currently controlled by the virtual object may include a shooting class, a throwing class, or a fight class. Certainly, the item type may alternatively include other types, which are not listed herein one by one. In a possible implementation, the item type may further include a type of a scope equipped on the virtual item, for example, a 2× scope, a 4× scope, or an 8× scope.

S703. Obtain a target movement trajectory of a projectile of the virtual item according to the shooting parameter adjustment operation and the status information.

After obtaining the status information of the virtual object, the terminal may learn, according to the status information, resistance to which the projectile of the virtual item is subject after fired. Therefore, the terminal may obtain the target movement trajectory of the projectile of the virtual item, so as to obtain related information of a current aiming point subsequently according to the target movement trajectory. The related information may be a distance between an aimed position in the virtual scene corresponding to the aiming point and the virtual object.

Figure 8:
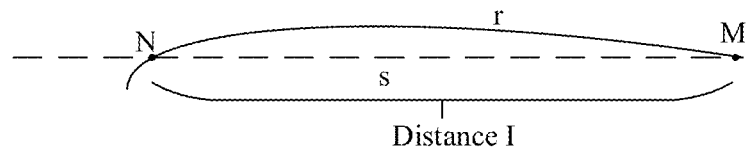
FIG. 8 is a schematic diagram of a distance between an aimed position in a virtual scene corresponding to an aiming point and a virtual object according to an embodiment of this application.

The target movement trajectory is a movement trajectory of the projectile of the virtual item if the virtual object is controlled to control the virtual item to shoot after the shooting parameter is adjusted according to the shooting parameter adjustment operation. The aimed position in the virtual scene corresponding to the aiming point is a position of an intersection point of an aiming direction indicated by the aiming point and the target movement trajectory. For example, as shown in FIG. 8, a curve r is a target movement trajectory of a projectile of a virtual item, an aiming direction indicated by an aiming point is a straight line s, and an aimed position in a virtual scene corresponding to the aiming point is a position of an intersection point N of the curve r and the straight line s. A distance I between the position of the intersection point and an initial position of the projectile, that is, a position M of a virtual object is related information of the current aiming point to be displayed in a terminal interface.

Figure 7B:
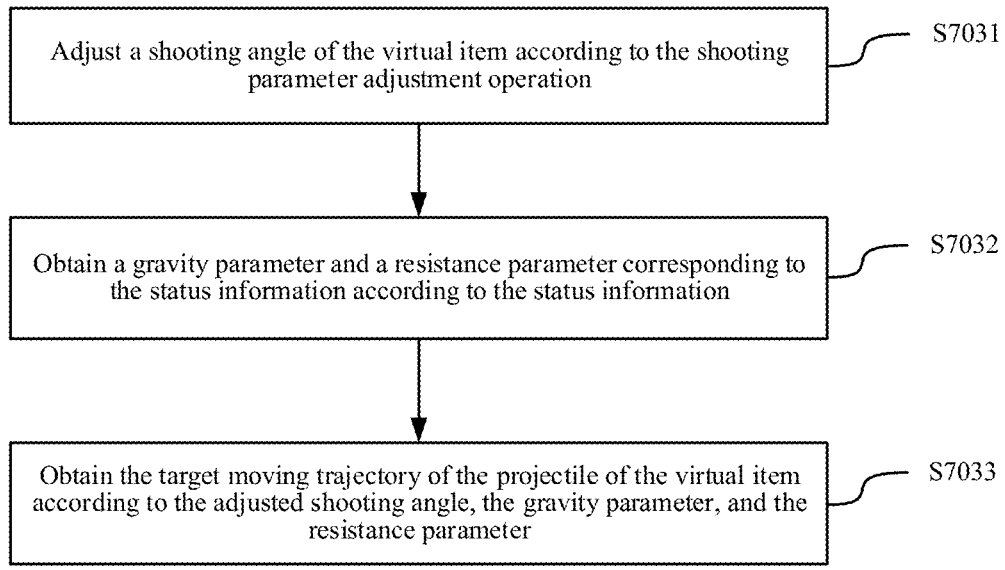

Specifically, FIG. 7(b) is a flowchart of step S703 according to an embodiment, which may include the following steps:

S7031. Adjust a shooting angle of the virtual item according to the shooting parameter adjustment operation.

Figure 9:
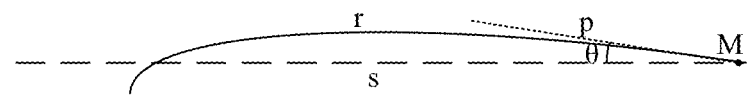
FIG. 9 is a schematic diagram of a shooting angle of a virtual item according to an embodiment of this application.

The shooting angle of the virtual item is an angle between an initial movement direction of the projectile of the virtual item and a horizontal direction. Certainly, the shooting angle may be alternatively an angle between an initial movement direction of the projectile of the virtual item and a direction indicated by an aiming point. This is not limited in this embodiment of this application. For example, the shooting angle is an angle between an initial movement direction of the projectile of the virtual item and a direction indicated by an aiming point. As shown in FIG. 9, a curve r is a target movement trajectory of a projectile of a virtual item, an aiming direction indicated by an aiming point is a straight line s, a direction of a tangent line p, passing through an initial position M of the projectile, of the curve r is an initial movement direction of the projectile, and an angle θ between the tangent line p and the straight line s is a shooting angle of the virtual item.

S7032. Obtain a gravity parameter and a resistance parameter corresponding to the status information according to the status information.

The terminal may further determine, according to the status information of the virtual object, a force to which the projectile of the virtual item is subject when fired. The projectile may be subject to gravity and resistance. Therefore, the terminal may obtain a gravity parameter and a resistance parameter.

When a movement state of the virtual object is different, the resistance parameter corresponding to the status information may be different. For example, resistance to which the projectile is subject when the virtual object is running may be greater than resistance to which the projectile is subject when the virtual object is staying still. When an ambient environment of the virtual object is different, the resistance parameter corresponding to the status information may also be different. For example, water resistance to which the projectile is subject when the virtual object is in water may be greater than air resistance to which the projectile is subject when the virtual object is on land. When the projectile is in water, the terminal may further obtain buoyancy. When the type of the item currently controlled by the virtual object is different, the gravity parameter corresponding to the status information and the resistance parameter corresponding to the status information may also be different. For example, gravity to which a projectile of a shooting virtual item is subject may be less than gravity to which a throwing virtual item is subject. Because the projectile of the shooting virtual item generally has a smaller size than the throwing virtual item, resistance to which the projectile of the shooting virtual item is subject may be less than resistance to which the throwing virtual item is subject. Alternatively, because a shooting speed of the projectile of the shooting virtual item is greater than a movement speed of the throwing virtual item, resistance to which the projectile of the shooting virtual item is subject may be greater than resistance to which the throwing virtual item is subject. This is not limited in this embodiment of this application. In a possible implementation, when the virtual item currently controlled by the virtual object is different, the gravity parameter corresponding to the status information and the resistance parameter corresponding to the status information may also be different. When the virtual item is different, the projectile of the virtual item may also be different, and parameters of gravity and resistance to which the projectile may be subject may also be different. Details are not further described herein.

A correspondence between the status information and the gravity or resistance parameter may be preset in the terminal. When obtaining status information, the terminal may obtain a gravity or resistance parameter corresponding to the status information according to the correspondence.

That the terminal performs step S7031 first and then performs step S7032 is merely used as an example for description. The terminal may alternatively perform step S7031 and step S7032 at the same time, or perform step S7032 first and then perform step S7031. An order of performing step S7031 and step S7032 is not limited in this embodiment of this application.

S7033. Obtain the target movement trajectory of the projectile of the virtual item according to the adjusted shooting angle, the gravity parameter, and the resistance parameter.

After determining the shooting angle of the virtual item, that is, determining an initial movement direction of the projectile of the virtual item, and determining a force to which the projectile is subject, the terminal may obtain the target movement trajectory of the projectile. If the user performs a shooting operation, the projectile of the virtual item moves according to the target movement trajectory.

A correspondence between a shooting angle, status information, and a movement trajectory may be preset in the terminal. In this way, the terminal may determine a shooting angle according to a shooting parameter adjustment operation, and obtain a corresponding movement trajectory from the correspondence based on the shooting angle and status information. This is not limited in this embodiment of this application.

S704. Obtain a distance between an aimed position in the virtual scene corresponding to a current aiming point and the virtual object based on the target movement trajectory.

A direction indicated by a current aiming point is a straight direction, while the target movement trajectory of the projectile is a curve because the projectile is further subject to gravity or resistance. For example, a ballistic of a bullet fired from a gun item falls, and therefore, the user cannot accurately know an aimed position in a virtual scene corresponding to an aiming point only through the aiming point, that is, the user cannot accurately know a projectile will hit which position in the virtual scene. In this embodiment of this application, to assist the user with more accurate aiming, a distance between the aimed position and the virtual object may be obtained according to the target movement trajectory, to further prompt the aimed position.

Specifically, the terminal may obtain a position of an intersection point of the target movement trajectory and the direction indicated by the aiming point, to obtain a distance between the position of the intersection point and the virtual object. The distance is in a positive correlation with the shooting angle. That is, a larger shooting angle indicates a larger distance.

S705. Display the distance in an interface.

Figure 10:
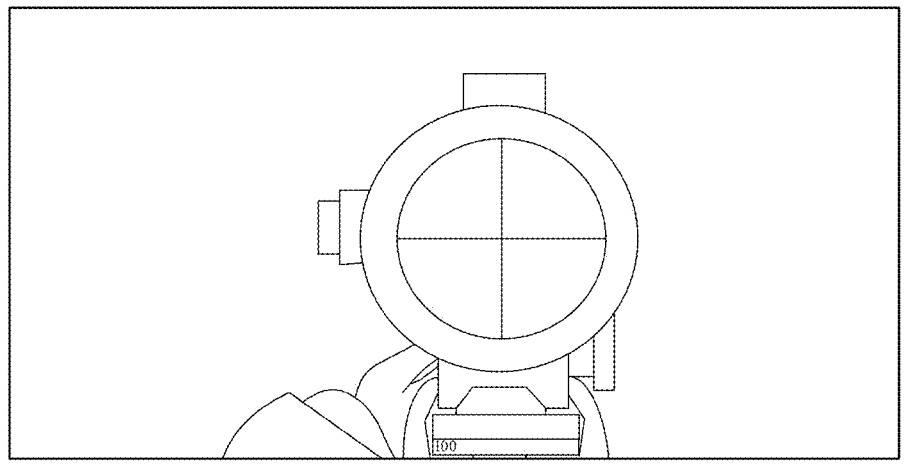
FIG. 10 is a schematic diagram of a terminal interface according to an embodiment of this application.
Figure 11:
FIG. 11 is a diagram of an actual terminal interface according to an embodiment of this application.

In a possible implementation, the terminal may display the distance at a specified position in the interface. The specified position may be preset by a person skilled in the art, or may be adjusted by the user according to usage habits of the user, which is not limited in this embodiment of this application. For example, as shown in FIG. 10, in step S704, the terminal determines that the distance between the aimed position in the virtual scene corresponding to the aiming point and the virtual object is 100 meters. Therefore, 100 may be displayed at a position used for displaying related parameter of a scope in the interface. An actual interface is shown in FIG. 11.

Step S703 to step S705 are a process of displaying the distance between the aimed position in the virtual scene corresponding to the current aiming point and the virtual object in the interface according to the shooting parameter adjustment operation and the status information. In this way, by using the direction indicated by the aiming point and the distance, the user may know a direction that a current aimed position is in and a distance between the aimed position and the user.

For example, the user may determine a distance between a virtual article or another virtual object in the virtual scene and the user based on a scope or other accessories, so as to perform the shooting parameter adjustment operation on the terminal, adjust the distance to the distance determined by the user, and move an aiming point to the virtual article or the another virtual object, thereby improving a hit rate.

In a specific embodiment, a correspondence between a shooting angle and a distance may be further preset in the terminal. After obtaining the adjusted shooting angle, the terminal obtains a distance corresponding to the shooting angle from the correspondence, and displays the distance in the interface. A specific used implementation is not limited in this embodiment of this application.

In an embodiment, when the scope equipped on the virtual item currently controlled by the virtual object is different, an adjustable range of the shooting angle may be different, and an adjustable range of the distance between the adjusted aimed position and the virtual object may also be different. This is not limited in this embodiment of this application. For example, an adjustable range of a distance corresponding to a 4×scope may be [100, 400], and an adjustable range of a distance corresponding to an 8× scope may be [100, 800]. In a possible implementation, the user may perform a shooting parameter adjustment operation, to adjust a distance to several preset fixed values. Quantities of fixed values corresponding to different scopes and specific fixed values may also be different. This is not specifically limited in this embodiment of this application. For example, a distance corresponding to a 4× scope may include 100, 200, 300, and 400, and a distance corresponding to an 8× scope may include 100, 200, 300, 400, 500, 600, 700, and 800. The values are described as examples, and the adjustable range of the distance and a specific value of the distance are not specifically limited in this embodiment of this application.

In a possible implementation, the terminal may further provide a shooting parameter restoration function. Correspondingly, when detecting a shooting parameter restoration operation, the terminal may restore the shooting angle to an initial shooting angle of the virtual item according to the shooting parameter restoration operation, obtain a distance between an aimed position in a virtual scene corresponding to a current aiming point and the virtual object according to the initial shooting angle and status information, and display the distance in the interface. For example, an initial shooting angle may be preset for the virtual item, and the user may perform a shooting parameter adjustment operation to adjust the shooting angle, or may perform a shooting parameter restoration operation to restore the shooting angle to the initial shooting angle. A more convenient operation manner is provided, thereby reducing complexity of the operation. An operation manner of the shooting parameter restoration operation may be preset by a person skilled in the art, or may be customized by the user according to usage habits of the user, which is not limited in the embodiments of this application.

For example, the initial shooting angle is 0, and a distance corresponding to the initial shooting angle is 100. If the user performs a shooting parameter restoration operation after adjusting a distance to 200 by adjusting a shooting angle, the terminal may determine that the shooting angle is 0 and the distance is 100, and display 100 in the interface.

That the item type of the virtual item is a shooting class is merely used as an example for description. When the item type of the virtual item is a throwing class, because the throwing virtual item generally cannot be equipped with a scope and an attack range of the throwing virtual item is generally close to the virtual object, for the throwing virtual item, to assist the user in controlling the virtual object to attack another virtual object more accurately, a movement trajectory of the virtual item may be displayed in the interface, so that the user can determine a droppoint of the virtual item according to the movement trajectory.

Specifically, when it is determined that the item type of the virtual item currently controlled by the virtual object is the throwing class according to the status information, the terminal may obtain a throwing angle of the virtual item according to a perspective orientation of a current virtual scene, obtain a target movement trajectory of the virtual item according to the throwing angle and the status information, and display the target movement trajectory in the interface. The perspective orientation of the virtual scene is an initial movement direction of the throwing virtual item, and the throwing angle is an angle between the perspective orientation and the horizontal direction. In this way, as the target movement trajectory of the throwing virtual item is displayed in the interface, the user may determine the droppoint of the virtual item according to the target movement trajectory, so as to assist the user in attacking another virtual object more accurately.

Similar to step S7032, when obtaining the target movement trajectory of the throwing virtual item, the terminal may alternatively obtain, according to status information, a gravity parameter corresponding to the status information and a resistance parameter corresponding to the status information, and obtain the target movement trajectory of the virtual item according to the throwing angle, the gravity parameter, and the resistance parameter.

In this embodiment of this application, a shooting parameter is adjusted according to a detected shooting parameter adjustment operation, and based on a state of a virtual object in a virtual scene, a distance between an aimed position in the virtual scene corresponding to an aiming point displayed in a current interface and the virtual object is determined and displayed in the interface, so that a user may further determine, based on the distance and a direction indicated by the aiming point, a position of the current aiming point in the virtual scene, so as to aim and shoot more accurately, and a display effect is good.

All the foregoing optional technical solutions may be arbitrarily combined to form an optional embodiment of this application, and details are not described herein.

Figure 12:
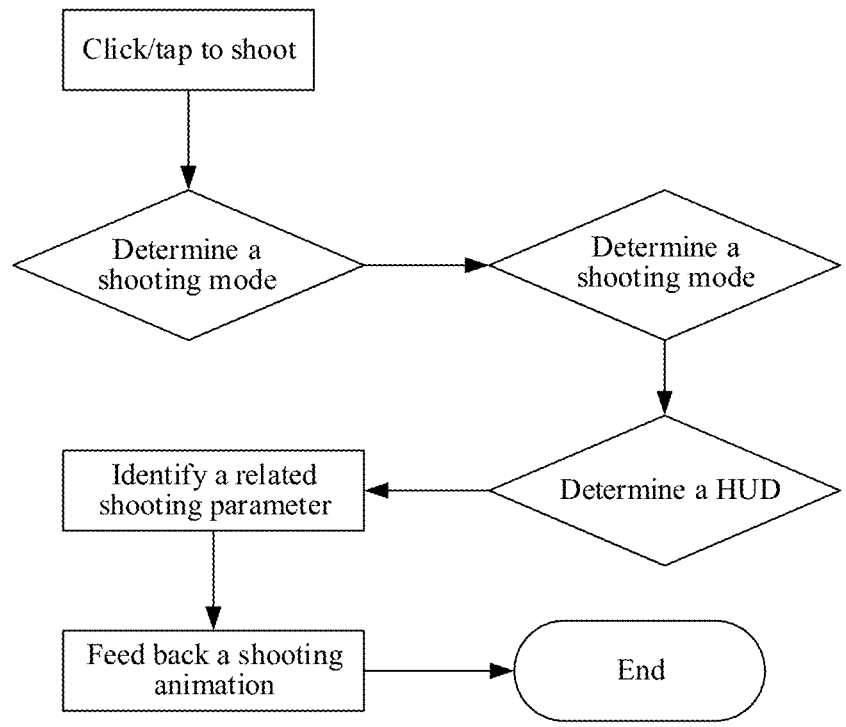
FIG. 12 is a flowchart of an interface display method according to an embodiment of this application.

The interface display method provided in the embodiments of this application may adopt any one or any combination of the three embodiments shown in FIG. 5, FIG. 6, and FIG. 7. As shown in FIG. 12, when the interface display method is applied to an electronic game scenario, when determining to-be-displayed content in an interface, after detecting a shooting operation of a user, a terminal may determine a current shooting mode, that is, determine a current camera mode, and determine a type of a gun currently controlled by a virtual object, that is, determine an item type of a virtual item currently controlled by a virtual object, and may further determine a head up display (HUD). The HUD refers to parameters of a virtual item and of related accessories of the virtual item that are displayed in an interface. After the foregoing determining, the terminal may determine a related shooting parameter based on a determining result. The related shooting parameter refers to the target rotation angle, the first rotation speed of the perspective, the second rotation speed of the virtual item, the shaking information of the camera, the distance between the aimed position in the virtual scene corresponding to the aiming point and the virtual object, or the like. The terminal may identify the related shooting parameter and return a shooting animation, that is, display the target animation, shaking of the virtual scene, and the distance in the interface.

Certainly, the interface display method may be further implemented by importing a real action, that is, a terminal may collect a large quantity of human actions in a real scene and related parameters, and when obtaining a camera mode or status information of a virtual object in a virtual scene, the terminal may match the obtained information with the collected parameters, to obtain a corresponding related parameter, for example, a shooting parameter, and display the obtained related parameter in an interface. For example, in the embodiment shown in FIG. 6, the status information of the current virtual object may be matched with status information of a person in the real scene. After obtaining matched shaking information of a camera from the collected related parameters, an effect that the virtual scene shakes according to the shaking information is displayed in the interface. The manner of importing real actions is applied to the embodiments shown in FIG. 5 and FIG. 7 in a similar manner, and details are not described herein again. Certainly, to ensure that an action of a virtual object is not distorted, related parameters in the manner of importing real actions are not easy to be modified. A manner of determining interface display information according to the obtained status information of the virtual object or a camera mode is more accurate, and has no action distortion.

Figure 13:
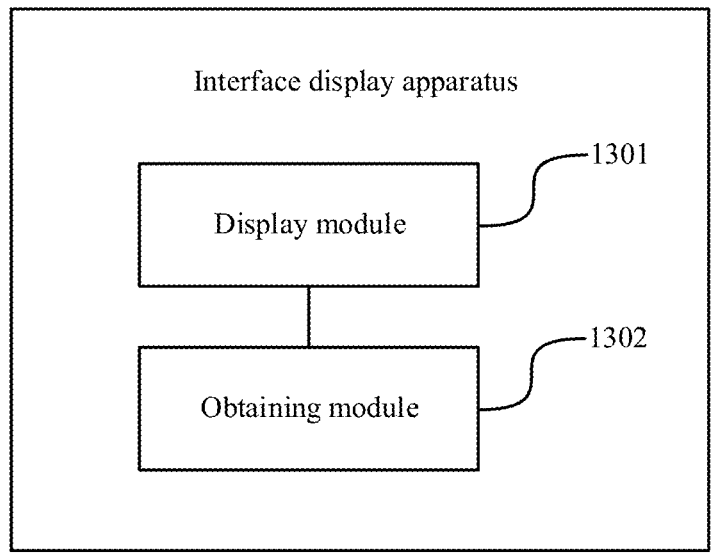
FIG. 13 is a schematic structural diagram of an interface display apparatus according to an embodiment of this application.

FIG. 13 is a schematic structural diagram of an interface display apparatus according to an embodiment of this application. Referring to FIG. 13, the apparatus includes:

a display module 1301, configured to display a virtual item currently controlled by a virtual object in a virtual scene; and an obtaining module 1302, configured to obtain, in a case that a perspective rotation operation is detected, a target rotation angle, a first rotation speed of a perspective, and a second rotation speed of the virtual item according to the perspective rotation operation, the second rotation speed being less than the first rotation speed;

the display module 1301 being configured to display, based on the target rotation angle, the first rotation speed of the perspective, and the second rotation speed of the virtual item, a target animation in a scene interface in which the virtual scene changes with the perspective rotation operation, the target animation being used for reflecting an effect that rotation of the virtual item lags behind rotation of the perspective.

In an embodiment, the obtaining module 1302 is further configured to obtain the target rotation angle and the first rotation speed of the perspective according to the perspective rotation operation, and use a product of the first rotation speed and a preset coefficient as the second rotation speed of the virtual item, the preset coefficient being less than a real number 1.

In an embodiment, the display module 1301 is further configured to determine a target movement trajectory of the virtual item in the virtual scene based on the target rotation angle, the first rotation speed of the perspective, and the second rotation speed of the virtual item, generate the target animation based on the target movement trajectory of the virtual item in the virtual scene, and display the target animation in the scene interface in which the virtual scene changes with the perspective rotation operation.

In an embodiment, a lag degree of the rotation of the virtual item relative to the rotation of the perspective varies with different camera modes.

In an embodiment, a lag degree of the rotation of the virtual item relative to the rotation of the perspective varies with different movement states of the virtual object.

In an embodiment, a lag degree of the rotation of the virtual item relative to the rotation of the perspective varies with different ambient environments of the virtual object.

In an embodiment, a lag degree of the rotation of the virtual item relative to the rotation of the perspective varies with different item types of the virtual item currently controlled by the virtual object.

In an embodiment, a lag degree of the rotation of the virtual item relative to the rotation of the perspective of the virtual object is a function of the target rotation angle and the first rotation speed of the perspective of the virtual object.

According to the apparatus provided in this embodiment of this application, when a perspective rotation operation is detected, the same rotation angle of a perspective and a virtual item currently controlled by a virtual object is obtained, and a first rotation speed of the perspective and a second rotation speed of the virtual item are obtained, the second rotation speed being less than the first rotation speed. In this way, the perspective and the virtual item rotate the same angle, but rotation of the virtual item is slower than rotation of the perspective. Therefore, when displaying corresponding content in an interface according to the perspective rotation operation, a terminal may display an effect that the rotation of the virtual item lags behind the rotation of the perspective, so that resistance to which a person is subject when turning with a weapon may be realistically simulated.

Figure 14:
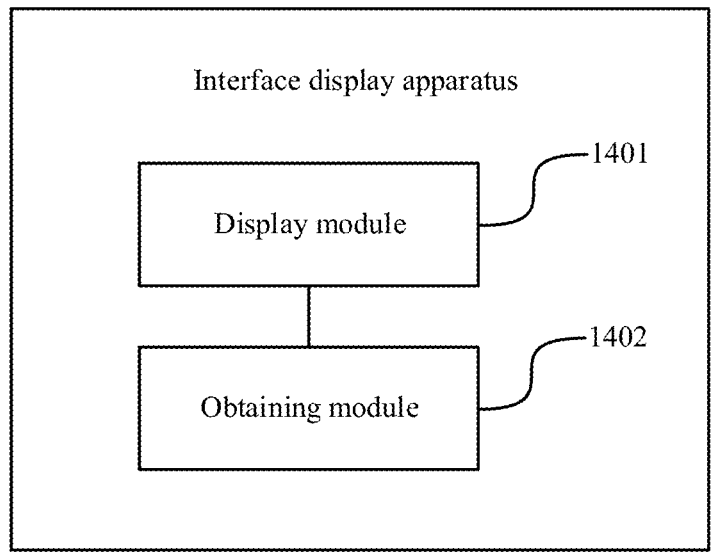
FIG. 14 is a schematic structural diagram of an interface display apparatus according to an embodiment of this application.

FIG. 14 is a schematic structural diagram of an interface display apparatus according to an embodiment of this application. Referring to FIG. 14, the apparatus includes:

an obtaining module 1401, configured to obtain status information of a virtual object in a virtual scene, the status information including at least one of a movement state of the virtual object, an ambient environment of the virtual object, and an item type of a virtual item currently controlled by the virtual object; and obtain shaking information of a camera according to a current camera mode and the status information; and a display module 1402, configured to display, in an interface according to the shaking information, that the virtual scene shakes with the camera.

In an embodiment, the obtaining module 1401 is further configured to determine first shaking information of the camera according to the status information in a case that the current camera mode is a first-person perspective of the virtual object and determine second shaking information of the camera according to the status information in a case that the current camera mode is a third-person perspective of the virtual object, a shaking degree corresponding to the second shaking information being less than a shaking degree corresponding to the first shaking information.

In an embodiment, the second shaking information is used for indicating that the camera does not shake.

In an embodiment, the shaking information includes at least one selected from combinations including a shaking direction, a shaking amplitude, and a shaking speed.

According to the apparatus provided in this embodiment of this application, how a camera shakes is determined according to a camera mode and status information of a virtual object in a virtual scene, and an effect that the virtual scene shakes with the camera is displayed in an interface by controlling the camera to shake, so that scene shaking seen by a person in different states in a real scene may be realistically simulated.

Figure 15:
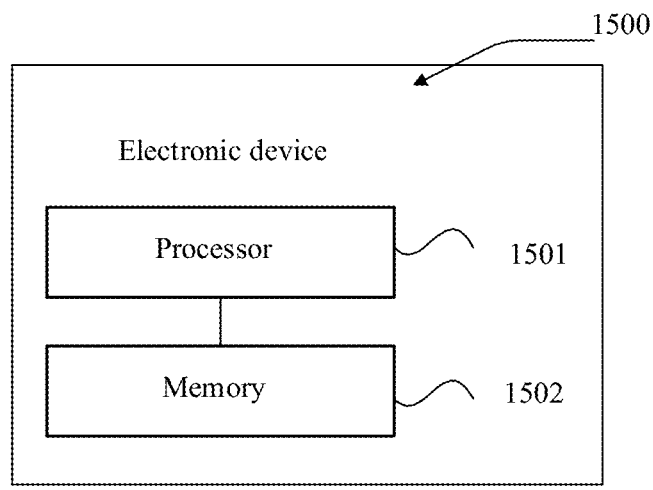
FIG. 15 is a schematic structural diagram of an electronic device according to an embodiment of this application.

FIG. 15 is a schematic structural diagram of an electronic device according to an embodiment of this application. The electronic device 1500 may vary greatly due to different configurations or performance, and may include one or more processors (central processing units (CPUs)) 1501 and one or more memories 1502. The memory 1502 stores computer-executable instructions. The computer-executable instructions are loaded and executed by the processors 1501 to implement the interface display method provided in the method embodiments. Certainly, the electronic device may further include components such as a wired or wireless network interface, a keyboard, and an input/output (I/O)

interface, to facilitate input and output. The electronic device may further include another component configured to implement a function of a device. Details are not further described herein.

In an embodiment, the interface display apparatus provided in this application may be implemented in a form of a computer-executable instruction, and the computer-executable instruction may run on the electronic device shown in FIG. 15. The memory of the electronic device may store program modules forming the interface display apparatus, for example, the display module and the obtaining module shown in FIG. 13 or FIG. 14. A computer instruction formed by the program modules causes the processor to perform the steps in the interface display method in the embodiments of this application described in this specification.

For example, the electronic device shown in FIG. 15 may perform step S501, step S504, step S505, and step S506 through the display module in the interface display apparatus shown in FIG. 13. The electronic device may perform step S502 and step S503 through the obtaining module.

For example, the electronic device shown in FIG. 15 may perform step S601, step S602, and step S603 through the obtaining module in the interface display apparatus shown in FIG. 14. The electronic device may perform step S604 and step S503 through the display module.

In an embodiment, an electronic device is provided, including: a memory and a processor, the memory storing computer-executable instructions, the computer-executable instructions, when executed by the processor, causing the processor to perform steps of the interface display method. Herein, the steps of the interface display method may be the steps of the interface display method in the foregoing embodiments.

In an embodiment, a non-volatile computer-readable storage medium is provided, storing a computer-executable instruction, the computer-executable instruction, when executed by one or more processors causing the one or more processors to perform steps of the interface display method. Herein, the steps of the interface display method may be the steps of the interface display method in the foregoing embodiments.

In an exemplary embodiment, a computer-readable storage medium, such as a memory including an instruction, is further provided, and the instruction may be executed by a processor to complete the interface display method in the foregoing embodiments. For example, the computer-readable storage medium may be a read-only memory (ROM), a random access memory (RAM), a CD-ROM, a magnetic tape, a floppy disk, or an optical data storage device.

A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a ROM, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. An interface display update method, performed by an electronic device having a processor and memory storing a plurality of computer-executable instructions to be executed by the processor, the method comprising:

displaying a virtual item currently controlled by a virtual object in a virtual scene;

detecting a perspective rotation operation associated with the virtual object;

obtaining a target rotation angle, a first rotation speed of a perspective of the virtual object, and a second rotation speed of the virtual item according to the perspective rotation operation, the second rotation speed being less than the first rotation speed; and updating the virtual scene, based on the target rotation angle, the first rotation speed of the perspective of the virtual object, and the second rotation speed of the virtual item, using a target animation in a scene interface in which the virtual scene changes in accordance with the perspective rotation operation, the target animation visualizing an effect that rotation of the virtual item lags behind rotation of the perspective of the virtual object.

2. The method according to claim 1, wherein the obtaining a target rotation angle, a first rotation speed of a perspective of the virtual object, and a second rotation speed of the virtual item according to the perspective rotation operation comprises:

obtaining the target rotation angle and the first rotation speed of the perspective of the virtual object according to the perspective rotation operation; and using a product of the first rotation speed and a preset coefficient as the second rotation speed of the virtual item, the preset coefficient being less than 1.

3. The method according to claim 1, wherein the updating the virtual scene, based on the target rotation angle, the first rotation speed of the perspective of the virtual object, and the second rotation speed of the virtual item, using a target animation in a scene interface in which the virtual scene changes in accordance with the perspective rotation operation comprises:

determining a target movement trajectory of the virtual item in the virtual scene based on the target rotation angle, the first rotation speed of the perspective of the virtual object, and the second rotation speed of the virtual item;

generating the target animation based on the target movement trajectory of the virtual item in the virtual scene; and displaying the target animation in the scene interface in which the virtual scene changes in accordance with the perspective rotation operation.

4. The method according to claim 1, wherein a lag degree of the rotation of the virtual item relative to the rotation of the perspective of the virtual object varies with different camera modes.

5. The method according to claim 1, wherein a lag degree of the rotation of the virtual item relative to the rotation of the perspective of the virtual object varies with different movement states of the virtual object.

6. The method according to claim 1, wherein a lag degree of the rotation of the virtual item relative to the rotation of the perspective of the virtual object varies with different ambient environments of the virtual object.

7. The method according to claim 1, wherein a lag degree of the rotation of the virtual item relative to the rotation of the perspective of the virtual object varies with different item types of the virtual item currently controlled by the virtual object.

8. The method according to claim 1, wherein a lag degree of the rotation of the virtual item relative to the rotation of the perspective of the virtual object is a function of the target rotation angle and the first rotation speed of the perspective of the virtual object.

9. An electronic device, comprising a processor and a memory, the memory storing a plurality of computer-executable instructions, the computer-executable instructions, when executed by the processor, causing the electronic device to perform operations including:
- displaying a virtual item currently controlled by a virtual object in a virtual scene;
- detecting a perspective rotation operation associated with the virtual object;
- obtaining a target rotation angle, a first rotation speed of a perspective of the virtual object, and a second rotation speed of the virtual item according to the perspective rotation operation, the second rotation speed being less than the first rotation speed; and
- updating the virtual scene, based on the target rotation angle, the first rotation speed of the perspective of the virtual object, and the second rotation speed of the virtual item, using a target animation in a scene interface in which the virtual scene changes in accordance with the perspective rotation operation, the target animation visualizing an effect that rotation of the virtual item lags behind rotation of the perspective of the virtual object.

10. The electronic device according to claim 9, wherein the obtaining a target rotation angle, a first rotation speed of a perspective of the virtual object, and a second rotation speed of the virtual item according to the perspective rotation operation comprises:
- obtaining the target rotation angle and the first rotation speed of the perspective of the virtual object according to the perspective rotation operation; and
- using a product of the first rotation speed and a preset coefficient as the second rotation speed of the virtual item, the preset coefficient being less than 1.

11. The electronic device according to claim 9, wherein the updating the virtual scene, based on the target rotation angle, the first rotation speed of the perspective of the virtual object, and the second rotation speed of the virtual item, using a target animation in a scene interface in which the virtual scene changes in accordance with the perspective rotation operation comprises:
- determining a target movement trajectory of the virtual item in the virtual scene based on the target rotation angle, the first rotation speed of the perspective of the virtual object, and the second rotation speed of the virtual item;
- generating the target animation based on the target movement trajectory of the virtual item in the virtual scene; and
- displaying the target animation in the scene interface in which the virtual scene changes in accordance with the perspective rotation operation.

12. The electronic device according to claim 9, wherein a lag degree of the rotation of the virtual item relative to the rotation of the perspective of the virtual object varies with different camera modes.

13. The electronic device according to claim 9, wherein a lag degree of the rotation of the virtual item relative to the rotation of the perspective of the virtual object varies with different movement states of the virtual object.

14. The electronic device according to claim 9, wherein a lag degree of the rotation of the virtual item relative to the rotation of the perspective of the virtual object varies with different ambient environments of the virtual object.

15. The electronic device according to claim 9, wherein a lag degree of the rotation of the virtual item relative to the rotation of the perspective of the virtual object varies with different item types of the virtual item currently controlled by the virtual object.

16. The electronic device according to claim 9, wherein a lag degree of the rotation of the virtual item relative to the rotation of the perspective of the virtual object is a function of the target rotation angle and the first rotation speed of the perspective of the virtual object.

17. A non-transitory computer-readable storage medium, storing a plurality of computer-executable instructions, the computer-executable instructions, when executed by a processor of an electronic device, causing the electronic device to perform operations including:
- displaying a virtual item currently controlled by a virtual object in a virtual scene;
- detecting a perspective rotation operation associated with the virtual object;
- obtaining a target rotation angle, a first rotation speed of a perspective of the virtual object, and a second rotation speed of the virtual item according to the perspective rotation operation, the second rotation speed being less than the first rotation speed; and
- updating the virtual scene, based on the target rotation angle, the first rotation speed of the perspective of the virtual object, and the second rotation speed of the virtual item, using a target animation in a scene interface in which the virtual scene changes in accordance with the perspective rotation operation, the target animation visualizing an effect that rotation of the virtual item lags behind rotation of the perspective of the virtual object.

18. The non-transitory computer-readable storage medium according to claim 17, wherein the obtaining a target rotation angle, a first rotation speed of a perspective of the virtual object, and a second rotation speed of the virtual item according to the perspective rotation operation comprises:
- obtaining the target rotation angle and the first rotation speed of the perspective of the virtual object according to the perspective rotation operation; and
- using a product of the first rotation speed and a preset coefficient as the second rotation speed of the virtual item, the preset coefficient being less than 1.

19. The non-transitory computer-readable storage medium according to claim 17, wherein the updating the virtual scene, based on the target rotation angle, the first rotation speed of the perspective of the virtual object, and the second rotation speed of the virtual item, using a target animation in a scene interface in which the virtual scene changes in accordance with the perspective rotation operation comprises:
- determining a target movement trajectory of the virtual item in the virtual scene based on the target rotation angle, the first rotation speed of the perspective of the virtual object, and the second rotation speed of the virtual item;
- generating the target animation based on the target movement trajectory of the virtual item in the virtual scene; and
- displaying the target animation in the scene interface in which the virtual scene changes in accordance with the perspective rotation operation.

20. The non-transitory computer-readable storage medium according to claim 17, wherein a lag degree of the rotation of the virtual item relative to the rotation of the perspective of the virtual object varies with different camera modes.

* * * * *